United States Patent [19]
Lieser et al.

[11] 3,852,777
[45] Dec. 3, 1974

[54] EXPOSURE CONTROL APPARATUS

[75] Inventors: Ernst Lieser, Stuttgart-Bad Cannstatt; Wolfgang Ort, Grunbach; Otto Wisst; Clemens Hopfner, both of Stuttgart, all of Germany

[73] Assignee: Eastman Kodak Company, Rochester, N.Y.

[22] Filed: Mar. 15, 1974

[21] Appl. No.: 451,713

[52] U.S. Cl............... 354/49, 354/21, 354/51, 354/58, 354/59, 354/60
[51] Int. Cl................... G03b 7/08, G03b 17/18
[58] Field of Search............ 354/23, 26, 28, 36, 37, 354/38, 48, 49, 50, 51, 58, 59, 60, 21

[56] References Cited
UNITED STATES PATENTS
3,446,128  5/1969  Dietz................. 354/50 X
3,678,827  7/1972  Eagle et al............ 354/21

Primary Examiner—Joseph F. Peters, Jr.
Attorney, Agent, or Firm—J. L. Palmer

[57] ABSTRACT

Light sensing exposure control apparatus that effects exposure in relation to scene illumination intensity includes (1) a circuit including light sensing means and an indicator energizable to indicate when a sensed illumination intensity is at or below a minimum level that corresponds to an exposure exceeding a predetermined duration, (2) a sensor that senses underexposure latitude of film received by the camera, and (3) a circuit coupled with the indicator circuit and latitude sensor and being responsive to concurrent sensing of the minimum intensity level or below and sensing the underexposure latitude of the film, to reduce the duration of the exposure by an amount corresponding to the underexposure latitude, and to adjust the indicator circuit to energize the indicator only after illumination intensity decreases below the minimum level by an amount corresponding to the underexposure latitude.

8 Claims, 3 Drawing Figures

EXPOSURE CONTROL APPARATUS

BACKGROUND OF THE INVENTION

FIELD OF THE INVENTION

This invention relates generally to camera exposure control apparatus and more particularly to camera exposure control apparatus that regulates exposure in accordance with the scene illumination intensity and the underexposure latitude of the film to be exposed.

DESCRIPTION OF THE PRIOR ART

Camera exposure control apparatus are known that sense the presence in the camera of a film cartridge of the type carrying film of a predetermined ASA rating or type such as "indoor" or "outdoor" film. These cameras have a light controlled adjustable diaphragm and/or shutter speed, and some also indicate to the operator that scene illumination intensity is at or below a minimum intensity level. The minimum level corresponds to a maximum aperture in a fixed shutter speed camera or an exposure interval in a variable shutter speed camera that is too long for an operator to hand-hold the camera steady during the exposure interval. Such indicator warns the operator that a flash unit or tripod is required if an exposure is to be made. The film used with these cameras is commonly of the type that can be underexposed by approximately ½ "stop" of exposure. The amount that the film can be underexposed without producing an underexposed photograph is often referred to as underexposure "latitude." The ½ stop underexposure latitude, if used during exposure, is correctable during processing or printing, but is not large enough to be effectively used as a parameter in adjusting camera exposure control apparatus.

Other types of film, however, are known to be underexposable by as much as 2-stops and still are correctable at processing or printing. A 2-stop underexposure latitude is large enough to be effectively used as a parameter in adjusting exposure control apparatus. Accordingly, commonly assigned U.S. Pat. No. 3,678,827 discloses a variable aperture, constant shutter speed camera, modified to sense the presence of such film in the camera and to adjust the indicator to become energized only after the aperture has been adjusted to a size that would produce an underexposure by more than the permissible 2-stops. Thus the operator is permitted to expose the film an additional 2-stops before being warned to use a flash unit. My invention is directed to apparatus for use with a camera having light sensitive shutter apparatus. By my invention, scene illumination intensity and underexposure latitude of film are sensed, and exposure is reduced below that produced at or beyond the hand-held limit by an amount related to the underexposure latitude of the film. Thus the camera can be operated in the hand-held mode during the addition of one or more stops of exposure when a flash unit or tripod would normally be used.

SUMMARY OF THE INVENTION

Therefore, an object of the present invention is to provide improved exposure control apparatus that effects exposure related to scene illumination intensity and which (1) senses underexposure latitude of film received by the camera, (2) senses the existence of at least a first minimum intensity condition that corresponds to an exposure interval at the limit of camera hand-held operation and (3) upon the concurrent sensing of both conditions, operates to adjust the exposure control apparatus to reduce the duration of the exposure by a predetermined amount.

Another object of the present invention is to provide improved exposure control apparatus that effects exposure related to scene illumination intensity and which (1) senses underexposure latitude of film received by the camera, (2) senses occurrence of an intensity within a range of minimum intensity conditions that correspond to exposure intervals beyond a duration that the camera can be hand-held steady during exposure, (3) upon concurrent sensing of both conditions, operates to modify the camera's mode of operation to permit satisfactory hand-held operation in the range of minimum intensity conditions and (4) indicates when an intensity at or lower than the lowest intensity in the range of intensities occurs.

A further object of the present invention is to provide improved exposure control apparatus that (1) senses the level of scene illumination intensity and provides an exposure appropriate for the existing intensity, (2) senses the underexposure latitude of film received by the camera, (3) upon sensing underexposure latitude and sensing an illumination intensity corresponding to an exposure of duration in excess of that which the camera can be hand-held steady during exposure, reduces the exposure a predetermined amount corresponding to the underexposure latitude of the film and (4) indicates the existence of an illumination intensity level corresponding to an exposure of duration beyond the limit of camera operation in the hand-held mode by at least the underexposure latitude of the film.

The invention is embodied in apparatus that effects an exposure related to received scene illumination intensity and includes a device that senses illumination intensity and indicates the existence of an intensity that corresponds to an exposure of duration during which it is difficult to hand-hold the camera steady during the entire exposure, a sensor that senses underexposure latitude of film received by the camera, and an adjustment device, coupled with the illumination sensing apparatus and latitude sensing apparatus to become active upon the concurrent sensing of the illumination intensity at the hand-held limit and film underexposure latitude, to reduce the exposure by a predetermined amount and to prevent energization of the indicator until the exposure interval is reduced below the hand-held limit by at least an amount corresponding to the underexposure latitude of the film.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
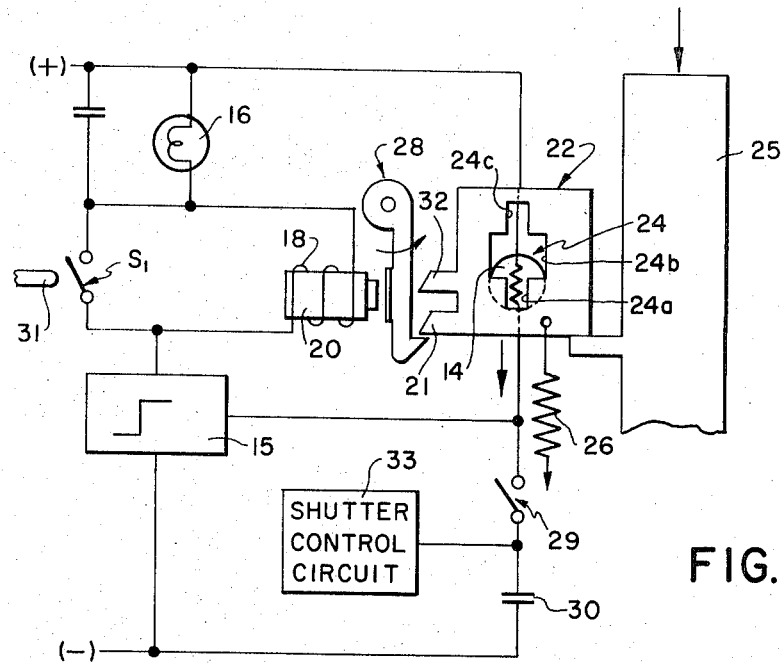
FIG. 1 is a schematic diagram of one embodiment of the invention in which electromechanical apparatus is operable to reduce the exposure when concurrent minimum illumination intensity and film underexposure sensing is effected.
Figure 3:
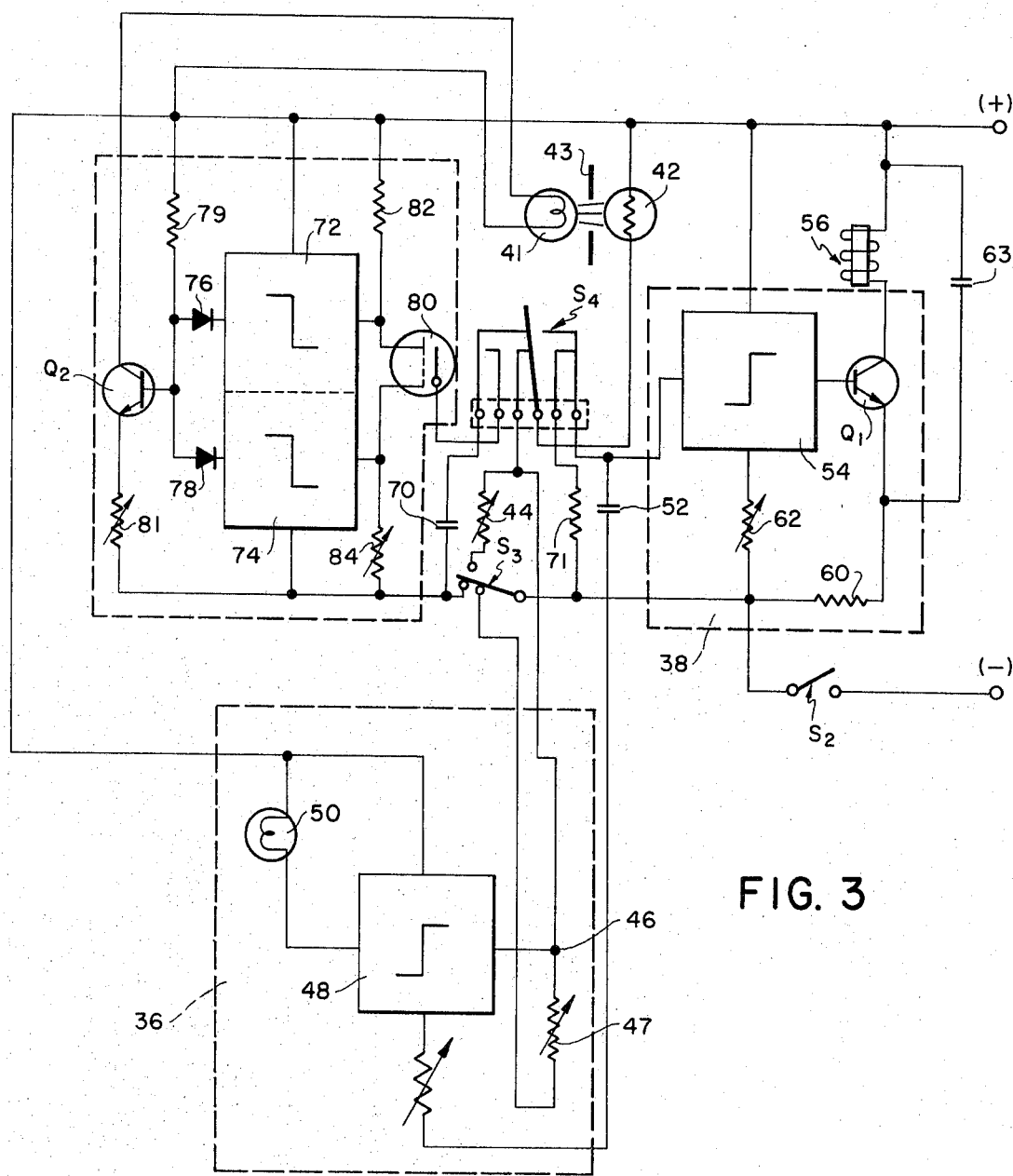
FIG. 3 is a schematic diagram of an embodiment of the invention which utilizes all electronic circuit components to effect exposure variations related to illumination intensity and to reduce the exposure interval when concurrent-minimum intensity and film sensing is achieved.

The invention is described with reference to two embodiments; the first embodiment is shown in FIG. 1, and the second embodiment is shown in FIG. 3. Commenting generally about both embodiments, they may be used with a fixed exposure aperture camera of the type that operates in a range of ambient scene illumination intensity levels, for example between 2,000 footlamberts and 5 footlamberts, to control the duration of an exposure in relation to the ambient scene illumination intensity. The camera may typically produce exposure intervals that vary between 1/300 sec. and 1 sec. 1/30 sec. is often considered to approximate the upper limit of the range of exposure intervals during which an operator can hand-hold the camera sufficiently steady to produce a sharp exposure. The scene illumination intensity that produces the 1/30 sec. exposure interval will vary for different cameras depending upon camera aperture and film speed, but, in each case regardless of the absolute level, is commonly referred to as the "low-light" intensity level, and will be referred to as such hereafter. Both embodiments operate, when scene illumination intensity is at or below the low-light level and film is in the camera that can be successfully used although underexposed by as much as a predetermined number of stops (i.e., of predetermined underexposure latitude), to reduce the exposure interval a number of stops corresponding to the underexposure latitude of the film; for example from 1/30 sec. to 1/120 sec. which corresponds to 2-stops. Therefore, the film is underexposed by its permissible limit, and the camera can be operated in a hand-held mode and additional number of stops of exposure. Additionally, both embodiments control an indicator to indicate when illumination intensity is below the low-light level by an amount equal to the underexposure latitude of the film.

The first embodiment is shown in FIG. 1 and will be described only in connection with its mode of operation in which film of underexposure latitude of approximately 2-stops, for examples, is in the camera. In this embodiment a control circuit 10 includes a photosensitive element 14, which may be cadmium sulfide or silicon photocell or the like, whose resistance varies inversely with received scene illumination intensity, and a threshold circuit 15 that performs a Schmitt Trigger function. The photocell 14 and the threshold 16, such as an incandescent lamp or light-emitting diode. The connection between indicator 16 and the threshold circuit 15 is through a winding 18 of an electromagnet 20. During energization of the indicator 16, the electromagnet 20, being series connected therewith, also become energized. The input of the threshold circuit 15 is connected to a camera potential source (not shown but indicated as + and −) through the photocell 14 and rises or falls as the resistance of the photocell 14 decreases or increases. During scene illumination intensity above the low-light level, the resistance of the photocell 14 is of value such that the input biases the threshold circuit 15 " off" but will become of value when the intensity falls as low as the low-light level so that the input biases the threshold circuit 15 "on." When the threshold circuit 15 is "on," a return path is provided to the potential source for the indicator 16; the indicator 16 thus becomes energized. When the threshold circuit 15 is "off," the return to the potential source is interrupted, thus the indicator 16 is not energized.

In accordance with the invention, the apparatus includes a mask 22, having an open section 24, which in the embodiment disclosed, comprises three rectangular sections of varied widths and lengths, selectively movable relative to the photocell 14. As a camera release 25 is operated, the mask 22 may be permitted to move under force of a spring 26, to position one of the rectangular sections relative to the photocell 14.

Initially (before operation of the camera release), a first rectangle 24a is positioned over the photocell 14, and is retained in that position by the camera release 25 and by an armature 28, a movable element associated with the electromagnet 20, which engages a first tab 21 of the mask 22. After the camera release 25 is operated, and if scene illumination intensity above the low-light level, the threshold circuit 15 is "off" and the electromagnet 20 is de-energized. Therefore, armature 28 retains the mask 22 in its initial position, and the first rectangle 24a remains positioned over the photocell 14.

When scene illumination intensity decreases to the low-light level, the following takes place. The input to the threshold circuit 15 decreases to below the threshold level and the treshold circuit 15 changes its operating state to an "on" condition; the indicator 16 and the electromagnet 20 become energized and the armature 28 is attracted to the electromagnet 20. As will be seen, the operation of the threshold circuit 15, indicator 16 and electromagnet 20 in the "on" condition is momentary. The movement of the armature 28 permits the spring 26 to move the mask 22 downward to position a second rectangle 24b, larger than the rectangle 24a, over the photocell 14. The larger opening of the rectangle 24b permits the photocell 14 to receive increased illumination. The resistance of the photocell 14 is thus reduced and results in a change in the voltage at the input of the threshold circuit 15 to a value above the threshold level; the threshold circuit 15 changes state to an "off" condition, and the indicator 16 and electromagnet 20 become de-energized. De-energization of the electromagnet 20 permits the armature 28 to return to the position shown in FIG. 1 wherein a second tab 32 of the mask 22 becomes positioned to be engaged by the armature 28. In this manner the mask 22 is held in a position in which the second rectangle 24b remains over the photocell 14.

As is well known in the art, the photocell 14 can also be coupled with a capacitor to establish an RC time constant that varies with the variations of scene illumination intensity. As schematically shown in FIG. 1, a switch 29 may be operated to connect a capacitor 30 and a shutter control circuit 32 to the photocell 14. When the switch 29 is closed, the RC elements (photocell 14 and capacitor 30) are connected with the potential source and a voltage is developed across the RC network that varies with time, and thus may be used to establish an exposure interval for a shutter control circuit 32. The threshold circuit 15 and shutter control circuit 32 are commonly associated together to form an exposure control circuit as may be seen by referring to commonly assigned U.S. Pat. No. 3,748,974 issued to Todd D. Cochran.

Figure 2:
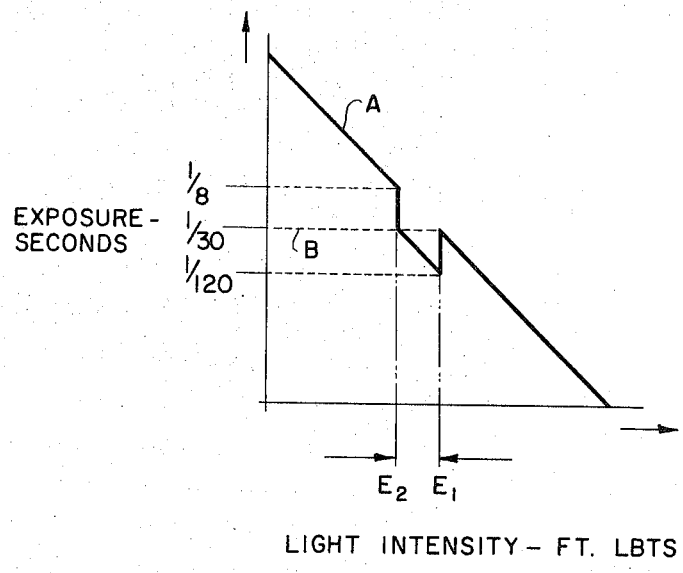
FIG. 2 is a graph relating exposure interval to ambient scene illumination intensity over a range of intensity levels and exposure intervals.

The results of the aforedescribed operation may be best understood by referring to the graph of FIG. 2. In the graph of FIG. 2, the abscissa describes ambient illumination intensity in an increasing direction to the right and the ordinate describes exposure intervals with increasing intervals upward. The illumination intensity at which the low-light indication occurs is at an exposure interval of 1/30 sec. duration and at an illumination intensity level $E_1$. The apparatus of this invention finds its widest application in exposure control apparatus that produces varied exposure intervals (over a range of intensities that extend considerably below the low-light level) such as between 1/300 and 1 sec. in length. However, the invention may also be used with exposure control apparatus of the type that has a maximum exposure interval for use at all illumination intensities below the low-light level. For this reason two types of operation are depicted in FIG. 2. The curve A results from apparatus that will produce an exposure interval in excess of a limit at the low-light level. The curve B results from apparatus that limits the exposure interval to, for example, 1/30 sec. at or beyond the low-light level. The exposure interval increases as scene illumination intensity decreases, and at the intensity level $E_1$, the resistance of the photocell 14, coupled with the capacitance of the capacitor 30, produces a 1/30 sec. exposure interval. During the period of operation up to the light level $E_1$, the rectangle 24a is over the photocell 14 and the exposure interval varies toward the 1/30 sec. interval as scene illumination intensity decreases. When the intensity level $E_1$ occurs, the indicator 16 and electromagnet 20 become energized, and the mask 22 moves downward to place the rectangle 24b over the photocell 14. The rectangle 24b, being larger than the rectangle 24a, permits the photocell 14 to receive increased illumination; the resistance decreases and results in the exposure interval immediately being reduced to 1/120 sec. in length, which is 2-stops below the normally established 1/30 sec. exposure interval. The 2-stop change corresponds to the film underexposure latitude.

An additional feature of the present invention includes a safeguard, as may be seen from FIGS. 1 and 2. The safeguard is operative if the scene illumination intensity is so slow as to underexpose the film by more than the permissible underexposure latitude of the film. For example, if illumination intensity is as low as $E_2$ of FIG. 2, it is more than 2-stops below the illumination intensity that corresponds to the hand-held limit, and is also beyond the underexposure latitude of the film. That is, an exposure interval would be equal to or exceed ⅛ sec. In such case the apparatus does not operate to reduce the exposure interval. To accomplish this operation, the mask 22 includes a small rectangle 24c beyond the large rectangle 24b. When the apparatus is operated at an illumination intensity of value $E_2$ or lower, the indicator 16 and the electromagnet 20 become energized, the armature 28 becomes attracted to the electromagnet 20, and the mask 22 moves to position the large rectangle 24b over the photocell 14. However, the illumination intensity, being more than 2-stops below the level corresponding to an exposure interval at the hand-held limit does not permit the photocell 14 to receive enough illumination to bias the threshold circuit 15 "off" to de-energize the indicator 16. The armature 22 thus remains out of a position to engage the second tab 32 of the mask 22, and the mask 22 continues to move to position the rectangle 24c over the photocell 14. The apparatus if operated generates an exposure interval equal to or longer than ⅛ sec., i.e., the apparatus would operate along a top portion of the graph of FIG. 2. The indicator 16 remains lighted to indicate that a tripod should be used. Thus it is seen that the apparatus only reduces the exposure interval during operation in a range of illumination intensity between $E_1$ and $E_2$, equal in exposure stops to the underexposure latitude of the film.

The apparatus may be controlled to operate as previously discussed or may be controlled in a conventional manner, as well known in the art, depending upon the position of the switch $S_1$. The switch $S_1$ is parallel-coupled with the electromagnet 20. If film not having a large underexposure latitude is received by the camera, the switch $S_1$ is closed by means of a tactile sensing member 31, or the like, to short the electromagnet 20. The electromagnet 20 never becomes energized and the apparatus of FIG. 1 operates along the curve of FIG. 2 without the break between 1/30 and ⅛ sec.

As previously described, the apparatus of FIG. 1 utilizes electromechanical means for varying the position of the mask 22 relative to the photocell 14 to establish operation of the apparatus. FIG. 3, which will now be described, discloses a fully electronic device that also operates along the curve A of FIG. 2. The circuit of the embodiment of FIG. 3 includes three distinct blocks that are outlined by dotted lines. A first block 36 includes low-light indicating apparatus. A second block 38 includes shutter control apparatus. A third block 40 includes apparatus for controlling operation of a light-emitting element 41, such as a tungsten lamp or the like that is located adjacent to a photosensitive element 42. The photosensitive element 42 may be similar to the photocell 14 of the first embodiment. When the light-emitting element 41 becomes energized, light is emitted through an apertured member 43 and impinges upon the photocell 42.

The block 36 is a conventional low-light indicating device, well known in the art as may be seen from U.S. Pat. No. 3,748,974 previously referred to, that is operative to indicate that the camera is generating an exposure interval beyond the hand-held limit of camera operation. The block 36 is modified to also, when film of 2-stops underexposure latitude is in the camera, indicate when an exposure interval of 2-stops below the hand-held limit occurs. Thus first and second low-light indications may be given. However, the two indications are mutually exclusive, i.e., one or the other may be given but not both at the same time, and depend upon the position of a switch $S_3$ to be described later. In the first mode, the apparatus given an indication of the 1/30 sec. or greater exposure interval by using the block 36 with a voltage divider network comprising the photocell 42 and a resistor 44. A junction 46 of the divider network is connected to a threshold circuit 48 to operate a low-light indicator 50. In the second mode, when the switch $S_3$ is as shown in FIG. 3, in which an indication of an ⅛ sec. or long exposure interval indication is given, the resistor 44 is decoupled from the photocell 42 and a second resistor 47 is coupled to the photocell 42.

The block 38 is also a conventional device, as may be seen by reference to U.S. Pat. No. 3,748,974, that uses the photocell 42 and a timing capacitor 52 to operate a threshold circuit 54 which energizes or de-energizes a shutter control electromagnet 56. The block 38, as shown, is used to "pull in" the electromagnet 56 to close a shutter but may, by minor changes, be made to "drop out" the electromagnet 56 as shown in the Cochran Patent. The block 38 also includes a transistor $Q_1$ that permits the output of the threshold circuit 54 to perform the "pull in" function. Resistors 60 and 62 are bias resistors and the capacitors 63 is a protective device for the transistor $Q_1$ when the elecromagnet 56 de-energizes.

To operate and functionally integrate the blocks 36, 38 and 40, the circuit of FIG. 3 uses a power switch $S_2$, a switch $S_3$ that is operative in response to sensing a film having a 2-stop permissible underexposure latitude in the camera and a coupling switch $S_4$. The switch $S_3$ is operated by a cartridge sensing mechanism such as the tactile sensing member 31 of FIG. 1, and the switches $S_2$ and $S_4$ are operated by a camera release mechanism or the like. The switch $S_4$ is a multipole single-throw switch, operative such that the blocks 36, 38 and 40 cooperatively operate to provide (1) the first or second low-light indication as appropriate, (2) the function of energizing the light-emitting element 41 that results in the exposure interval time being reduced by 2-stops and (3) the shutter timing and control.

The scene light sensing and low-light indication of either an intensity corresponding to an exposure interval of 1/30 sec. or below, or ⅛ sec. or below, is performed when the switch $S_4$ is in the position shown in FIG. 3. In this position, depending upon the position of the switch $S_3$, the photocell 42 is either coupled with the variable resistor 44 or 47 to establish the voltage divider that actuates the threshold circuit 48. Also the photocell 42 is coupled with a capacitor 70 to precharge the capacitor 70 to a level related to scene illumination intensity. When the switch $S_4$ is actuated to its second position, the capacitor 70 is coupled to the block 40, the variable resistor 44 or 47, depending upon the one used, is decoupled from the photocell 42, and the photocell 42 is coupled in series circuit with the timing capacitor 52. The photocell 42 and capacitor 52 provide a threshold voltage to an input of the threshold circuit 54 to energize the electromagnet 56, and thus permit a shutter mechanism (not shown) to close and terminate an exposure.

When making an exposure with the switch $S_3$ in the position of FIG. 3 (indicating wide underexposure latitude film in the camera and the only operating condition considered herein) and when the indicator 50 is not energized (indicating that scene illumination intensity is above the value $E_2$), the operator may hand-hold the camera and actuate the shutter mechanism. Simultaneously with operation of the shutter mechanism, the switch $S_4$ is moved to a position in which the capacitor 70, previously charged in relation to illumination intensity level, is connected to the input of the block 40 and the capacitor 52 is connected in series circuit with the photocell 42. A resistor 71 normally shunts the capacitor 52 to insure a zero voltage level on the capacitor 52, but is switched out of circuit as the switch $S_4$ is actuated. The operation of the switch $S_4$ may be a make-before-break action to permit the capacitor 70 to be coupled to the input of the block 40 prior to actuation of the shutter mechanism to open an exposure aperture (not shown). Thus if the charge on the capacitor 70 is of a value corresponding to an illumination intensity between $E_1$ and $E_2$, the light-emitting element 41 becomes lighted to provide illumination to reduce the value of resistance of the photocell 42 (already at a present value due to ambient illumination intensity) prior to its use for shutter timing.

To effect energization of the light-emitting element 41 after the switch $S_4$ is operated, the block 40 includes a field-effect transistor 80, hereafter referred to as FET 80, having its drain connected to a threshold circuit 72, its source connected to a threshold circuit 74 and its gate connectable with the capacitor 70 via the switch $S_4$. The threshold circuits 72, 74 are of the type that perform the Schmitt Trigger function as previously referred to with reference to FIG. 1. The output of the threshold circuits 72, 74 respectively are coupled through diodes 76, 78 respectively to the base of a transistor $Q_2$ and to the + potential source through a resistor 79. The collector of the transistor $Q_2$ is connected to one lead of the light-emitting element 41 (the other lead being connected to the + potential source); the emitter is returned through a resistor 81 to the negative side of the potential source via switch $S_3$. The resistor 81 is used to set the threshold level of the block 40. The input of the threshold circuit 72 is coupled through a resistor 82 to the positive side of the potential source and the input to the threshold circuit 74 is coupled to the negative side of the potential source through a resistor 84. Consequently, the threshold circuit 72 is biased "on" and its output is in a "high" state, and the threshold circuit 74 is biased "off" with its output in a "low" state. With the threshold circuits 72, 74 so biased. the diode 78 is forward biased and the transistor $Q_2$ is nonconductive; the light-emitting element 41 is therefore not lighted.

Both of the threshold circuits 72, 74 must have their respective outputs in a "high" state for the transistor $Q_2$ to be conductive. Also, both should operate only between illumination intensities $E_1$ and $E_2$. This is accomplished as follows. As the FET 80 is biased between "off" and full "on," the output of the threshold circuit 74 becomes "high" when a voltage on the capacitor 70 reaches a level that corresponds to an illumination intensity of value $E_1$. Illumination intensity of value $E_1$ incident on the photocell 42, reduces the resistance of the photocell 42 to a value that permits the capacitor 70 to, charge to a level which, upon operation of switch $S_4$, biases the FET 80 to a predetermined "on" condition that changes the operative state of the threshold circuit 74 from "low" to "high". The output of the threshold circuits 72, 74 being in the "high" state, the diodes 76, 78 are back biased and the transistor $Q_2$ is biased "on;" the light-emitting element 41 therefore becomes lighted. As the light intensity decreases, the resistance of the photocell 42 permits the charge upon the capacitor 70 to increase. The increased bias causes the FET 80 to conduct harder and the threshold voltage of the threshold circuit 72 drops. When an illumination intensity level exists, the indicator 50 is lighted to indicate that a tripod is required. The resistance of the photocell 42 permits the charge upon the capacitor 70 to reach a level to bias the FET 80 to a point in its transition from "off" to "on" that will change the operative state of the threshold circuit 72. The output of the threshold circuit 72 goes "low," and the transistor $Q_2$ becomes nonconductive. Thus during intensity conditions at or lower than the value $E_2$, the threshold circuit 74 remains in the condition with its output in a "low" state and the transistor $Q_2$ is nonconductive; the light-emitting element 41 is therefore not lighted. The exposure interval produced is along the top portion of curve A of FIG. 2. The apparatus of block 40, therefore, as did the embodiment of FIG. 1, operates to reduce exposure only over a narrow range of illumination intensities, such as between the levels $E_1$ and $E_2$ which could correspond in stops to the underexposure latitude of the film.

If film not having a wide underexposure latitude is received by the camera, the switch $S_3$ occupies its second position and the resistor 44 is coupled in series circuit with the photocell 42 for conventional low-light sensing, i.e., indicating scene illumination intensity at a level that creates an exposure interval of 1/30 sec. or below. Also the return path to the negative source for the block 40 is open, thus the block 40 is disabled. The block 36 therefore operates in a conventional manner as disclosed in the U.S. patent to Todd D. Cochran.

The invention is described in detail with particular reference to preferred embodiments thereof, but it will be understood that variations and modifications can be effected within the spirit and scope of the invention.

We claim:

1. In a camera adapted to receive film of various exposure latitudes and to make exposures of varying duration, the combination comprising:
    light sensitive means for sensing the intensity of received scene illumination and having a parameter variable as the intensity of illumination thereon varies;
    exposure control apparatus, coupled with said light sensitive means and being responsive to variations of said parameter, for varying the duration of an exposure in relation to said parameter and thus to received illumination intensity;
    means for sensing the presence in said camera of film of a predetermined exposure latitude;
    control means, coupled with said light sensitive means and cooperative therewith and with said film sensing means, to become active upon the concurrent sensing of the presence of such film of predetermined exposure latitude and an illumination intensity in a range of predetermined intensities that correspond to exposures exceeding a predetermined duration, for providing a control output; and illumination adjustment means, coupled with said control means and being responsive to said output, for increasing the illumination received by said light sensitive means.

2. In a camera adapted to receive film of various underexposure latitudes and to make exposures of varying duration, the combination comprising:
    photosensitive means located for receiving scene illumination;
    exposure control means, including said photosensitive means, for effecting an exposure of duration related to received illumination intensity, said exposure control means being responsive to the sensing of a predetermined range of intensities by said photosensitive means, for generating a range of exposures each exceeding a predetermined duration;

means for sensing the underexposure latitude of film received by the camera; and
    illumination adjustment means, cooperative with said photosensitive means and said underexposure latitude sensing means to become active upon concurrent sensing of illumination intensity in said predetermined range and sensing a predetermined underexposure latitude, for increasing the illumination intensity received by said photosensitive means by an amount corresponding to the underexposure latitude of the film.

3. In a camera adapted to receive film of various underexposure latitudes and to make exposures of varying duration, exposure control apparatus comprising:
    photosensitive means for sensing the intensity of existing scene illumination;
    circuit means, coupled with said photosensitive means and being responsive thereto, for controlling the duration of an exposure in relation to the illumination intensity, said circuit means, when scene illumination intensity is at or below a minimum intensity, producing exposures exceeding a predetermined duration;
    sensor means for sensing the underexposure latitude of film received by the camera;
    adjustment means, coupled with said circuit means and becoming active upon the combination of sensing illumination intensity at or below said minimum intensity and sensing a predetermined underexposure latitude of the film, for increasing the amount of illumination received by said photosensitive means; and
    an indicator coupled with said photosensitive means and latitude sensing means and being responsive thereto to become energized upon concurrent sensing said film underexposure latitude and an illumination intensity lower than said minimum intensity by an amount corresponding to the underexposure latitude of the film.

4. In a camera having means for sensing the presence of a film cartridge carrying film of predetermined underexposure latitude received by the camera and means for making exposures of varying duration, exposure control apparatus comprising:
    a photosensitive element located to receive light and having a parameter related to received light intensity, said photosensitive element being connected with said exposure making means for effecting an exposure interval of duration related to the value of said parameter, said parameter attaining values corresponding to exposures exceeding a predetermined duration;
    adjustment means, mounted for movement relative to said photosensitive element and being movable in response to the combination of the sensing of said film and sensing an illumination intensity in which said parameter attains said values corresponding to said predetermined exposures of duration exceeding said predetermined duration, for permitting the amount of light received by said photosensitive element to be increased by an amount related to the underexposure latitude of said film; and
    indicator means, coupled with said photosensitive element and said film cartridge sensing means to become energized upon said parameter attaining a value corresponding to an exposure of duration longer than said predetermined duration by an amount corresponding to the underexposure latitude of said film.

5. In a camera adapted to receive film of various underexposure latitudes and to make exposures of varying duration, the combination comprising:
- a photosensitive element, disposed to receive ambient scene illumination, for sensing the ambient illumination intensity;
- memory circuit means, connected with said photosensitive means, for storing a signal indicative of the level of existing illumination intensity;
- means for sensing the underexposure latitude of film received by the camera;
- a circuit, including a light emitting element located to emit light to impinge onto said photosensitive element, said circuit being connectable with said memory circuit said latitude sensing means to become operative in response to the combination of said stored signal and sensing such film, for operating said light-emitting element to emit light; and
- timing circuit means, connectable with said photosensitive means and said exposure making means, for effecting an exposure of duration corresponding to the combined intensity of ambient illumination and the light emitted by said light-emitting element.

6. In a camera, exposure control apparatus comprising:
- means, located to receive ambient scene illumination, for sensing the level of ambient illumination intensity;
- exposure control apparatus, associated with said illumination sensing means, for effecting the duration of an exposure in relation to ambient illumination intensity, said apparatus, during illumination intensity in a range of intensities at or below a minimum intensity, effecting an exposure exceeding a predetermined duration;
- means for sensing the underexposure latitude of film received by the camera;
- indicator means, cooperative with said illumination sensing means, for indicating when said exposure will exceed said predetermined duration by an amount corresponding to said underexposure latitude;
- a mask mounted for movement relative to said illumination sensing means to vary the illumination received thereby; and
- control means, coupled with said latitude sensing means and said indicating means and being associatable with said mask means in response to concurrent sensing illumination intensity corresponding to an exposure of duration longer than said predetermined duration and the sensing of a predetermined exposure latitude, for positioning said mask relative to said illumination sensing means according to the intensity of ambient illumination.

7. Apparatus as claimed in claim 6 wherein said control means includes an electromagnetic transducer connected with said illumination sensing element to become energized when said indicating means becomes energized.

8. In a camera, the combination comprising:
- light sensitive means for sensing the level of received light intensity and having a parameter variable as received light intensity varies;
- exposure control apparatus, coupled with said light sensing means and being responsive to the value of said parameter, for effecting an exposure of duration related to said parameter;
- indicator means, coupled with said light sensing means and being responsive thereto, for indicating received light intensity that corresponds to an exposure exceeding a predetermined duration;
- means for sensing the underexposure latitude of film received by the camera; and
- adjustment means, cooperative with said exposure control apparatus and said light sensitive means and being responsive to concurrent underexposure latitude sensing and sensing light intensity at or below a first minimum level, for reducing the exposure duration a predetermined amount corresponding to the film underexposure latitude and for de-energizing said indicator, said adjustment means being further cooperative with said exposure control apparatus and said indicator for discontinuing reduction of said exposure duration and re-energizing said indicator upon sensing a received light intensity an amount equal to said film underexposure latitude below said first minimum level.

* * * * *